United States Patent
Teipel et al.

(10) Patent No.: US 10,626,226 B2
(45) Date of Patent: Apr. 21, 2020

(54) SYNTHETICALLY MODIFIED THERMOPLASTIC POLYMER COMPOSITES HAVING CELLULOSE NANOMATERIALS

(71) Applicant: Essentium Materials, LLC, College Station, TX (US)

(72) Inventors: Blake Teipel, College Station, TX (US); Elisa Teipel, College Station, TX (US); Matt Kirby, College Station, TX (US); Ryan Vano, College Station, TX (US); Mustafa Akbulut, College Station, TX (US)

(73) Assignee: Essentium Inc., Pflugerville, TX (US)

( * ) Notice: Subject to any disclaimer, the term of this patent is extended or adjusted under 35 U.S.C. 154(b) by 158 days.

(21) Appl. No.: 15/739,369

(22) PCT Filed: Jun. 30, 2016

(86) PCT No.: PCT/US2016/040487
§ 371 (c)(1),
(2) Date: Dec. 22, 2017

(87) PCT Pub. No.: WO2017/004415
PCT Pub. Date: Jan. 5, 2017

(65) Prior Publication Data
US 2018/0186940 A1 Jul. 5, 2018

Related U.S. Application Data

(60) Provisional application No. 62/186,417, filed on Jun. 30, 2015.

(51) Int. Cl.
*C08J 3/12* (2006.01)
*B82Y 30/00* (2011.01)
(Continued)

(52) U.S. Cl.
CPC ............... *C08J 3/126* (2013.01); *B82Y 30/00* (2013.01); *C08F 120/08* (2013.01); *C08L 1/02* (2013.01);
(Continued)

(58) Field of Classification Search
CPC ........ C08J 3/126; C08J 3/128; C08J 2301/02; C08J 2401/02; B82Y 10/00; C08F 120/08;
(Continued)

(56) References Cited

FOREIGN PATENT DOCUMENTS

EP 964022 A1 12/1999
EP 2492305 A1 8/2012
(Continued)

OTHER PUBLICATIONS

Habibi, Y.; Lucia, L. A.; Rojas, O. J. Cellulose Nanocrystals: Chemistry, Self-Assembly, and Applications. Chemical Reviews 2010, 110, 3479-3500.
(Continued)

*Primary Examiner* — Stella K Yi
(74) *Attorney, Agent, or Firm* — Vivacqua Law, PLLC.

(57) ABSTRACT

A method of manufacturing a polymer coated cellulose nanocrystal composite material begins with an aqueous cellulose nanocrystal (CNC) suspension mixture. The aqueous CNC suspension mixture is dried to remove the liquid solvent from the aqueous CNC suspension mixture to form a dry CNC powder. Diethylenetriamine (DETA) is combined with melted Maleated-anhydride Polypropylene (MAPP) to form a DETA-functionalized MAPP (MA) mixture. The MA mixture is cooled and pelletized to form MA pellets. The MA pellets, the dry CNC powder, and a neat polypropylene (PP) are combined to form a CNC-PP mixture. The CNC-PP mixture is compounded by melting, subsequently cooled and pelletized to form CNC-PP pellets.

13 Claims, 6 Drawing Sheets

(51) Int. Cl.
  C08L 1/02    (2006.01)
  C09D 123/26  (2006.01)
  C08F 120/08  (2006.01)
  C08L 33/00   (2006.01)
(52) U.S. Cl.
  CPC ............ *C08L 33/00* (2013.01); *C09D 123/26* (2013.01); *C08F 2500/24* (2013.01); *C08J 2300/22* (2013.01); *C08L 2205/16* (2013.01); *C08L 2205/18* (2013.01); *C08L 2207/53* (2013.01)
(58) Field of Classification Search
  CPC .......... C08F 1/02; C08F 33/00; C09D 101/02; C09D 123/26; B29C 33/66; B29C 2045/0091; B29C 65/348; B29C 65/368
  See application file for complete search history.

(56) References Cited

FOREIGN PATENT DOCUMENTS

| | | |
|---|---|---|
| WO | 2014119745 A1 | 8/2014 |
| WO | 2015009972 A1 | 1/2015 |

OTHER PUBLICATIONS

Padalkar, S.; Capadona, J. R.; Rowan, S. J.; Weder, C.; Won, Y.-H.; Stanciu, L. A.; Moon, R. J. Natural Biopolymers: Novel Templates for the Synthesis of Nanostructures. Langmuir 2010, 26, 8497-8502.
Moon, R. J.; Martini, A.; Nairn, J.; Simonsen, J.; Youngblood, J. Cellulose nanomaterials review: structure, properties and nanocomposites. Chem. Soc. Rev. 2011, 40, 3941-3994.
Eichhorn, S.; Dufresne, A.; Aranguren, M.; Marcovich, N.; Capadona, J.; Rowan, S.; Weder, C.; Thielemans, W.; Roman, M.; Renneckar, S.; Gindl, W.; Veigel, S.; Keckes, J.; Yano, H.; Abe, K.; Nog, M.; Nakagaito, A.; Mangalam, A.; Simonsen, J.; Benight, A.; Bismarck, A.; Berglund, L.; Peijs, T. Review: current international research into cellulose nanofibres and nanocomposites. Journal of Materials Science 2010, 45, 1-33.
Alamri, H.; Low, I. M. Characterization of epoxy hybrid composites filled with cellulose fibers and nano-SiC. Journal of Applied Polymer Science 2012, 126, E221-E231.
Cross, L., Schueneman, G., Mintz E., Polymer Matrix Nanocomposites via Forest Derived Nanomaterials, Proceedings of TechConnect World Summit, Expo, and Showcase 2012, 284-287.
Pullawan, T.; Wilkinson, A. N.; Eichhorn, S. J. Influence of Magnetic Field Alignment of Cellulose Whiskers on the Mechanics of All-Cellulose Nanocomposites. Biomacromolecules 2012, 13, 2528-2536.
Kloser, E.; Gray, D. G. Surface Grafting of Cellulose Nanocrystals with Poly(ethylene oxide) in Aqueous Media. Langmuir 2010, 26, 13450-13456.
Elazzouzi-Hafraoui, S.; Nishiyama, Y.; Putaux, J.-L.; Heux, L.; Dubreuil, F.; Rochas, C. The Shape and Size Distribution of Crystalline Nanoparticles Prepared by Acid Hydrolysis of Native Cellulose. Biomacromolecules 2007, 9, 57-65.
SCONA TPPP 8112 GA. Instruments, B. A. a., Ed.; Altana Corporation, 2013.
Trilwax H98. Trillium Specialties LLC, 2010.
Sun, X. Z., et al., Evaluation of Energy Consumption and Greenhouse Gas Emissions in Preparation of Cellulose Nanofibers from Woody Biomass. 2013, 1061-1067.
Joshi, S. V.; Drzal, L. T.; Mohanty, A. K.; Arora, S. Are natural fiber composites environmentally superior to glass fiber reinforced composites? Composites Part A: Applied Science and Manufacturing 2004, 35, 371-376.
Bledzki, A. K.; Gassan, J. Composites reinforced with cellulose based fibres. Progress in Polymer Science 1999, 24, 221-274.
Tang, H.; Butchosa, N.; Zhou, Q. A Transparent, Hazy, and Strong Macroscopic Ribbon of Oriented Cellulose Nanofibrils Bearing Poly(ethylene glycol). Advanced Materials 2015, 70, 2070-2076.
Peng, B.; Han, X.; Liu, H.; Berry, R. C.; Tam, K. C. Interactions between surfactants and polymer-grafted nanocrystalline cellulose. Colloids and Surfaces A: Physicochemical and Engineering Aspects 2013, 421, 142-149.
Liu, L.; Grunlan, J. C. Clay assisted dispersion of carbon nanotubes in conductive epoxy nanocomposites. Advanced Functional Materials 2007, 17, 2343-2348.
Araki, J. Electrostatic or steric?—preparations and characterizations of well-dispersed systems containing rod-like nanowhiskers of crystalline polysaccharides. Soft Matter 2013, 9, 4125-4141.
Ljungberg, N.; Bonini, C.; Bortolussi, F.; Boisson, C.; Heux, L.; Cavaillé, J. Y. New nanocomposite materials reinforced with cellulose whiskers in atactic polypropylene: effect of surface and dispersion characteristics. Biomacromolecules 2005, 6, 2732-2739.
Teipel, B. R.; Grunlan, J. Synergy in Epoxy Nanocomposites with Cellulose Nanocrystals and Boehmite. Green Materials 2014.
Araki, J.; Wada, M.; Kuga, S.; Okano, T. Flow properties of microcrystalline cellulose suspension prepared by acid treatment of native cellulose. Colloids and Surfaces A: Physicochemical and Engineering Aspects 1998, 142, 75-82.
Beck-Candanedo, S.; Roman, M.; Gray, D. G. Effect of Reaction Conditions on the Properties and Behavior of Wood Cellulose Nanocrystal Suspensions. Biomacromolecules 2005, 6, 1048-1054.
Cui, L.; Paul, D. R. Evaluation of amine functionalized polypropylenes as compatibilizers for polypropylene nanocomposites. Polymer 2007, 48, 1632-1640.
Sathe, S. N.; Rao, G. S. S.; Devi, S. Grafting of maleic anhydride onto polypropylene: Synthesis and characterization. Journal of Applied Polymer Science 1994, 53, 239-245.
Iyer, K. A.; Torkelson, J. M. Sustainable Green Hybrids of Polyolefins and Lignin Yield Major Improvements in Mechanical Properties Wnen Prepared via Solid-State Shear Pulverization. ACS Sustainable Chemistry & Engineering 2015, 959-968.
Chandra, R. P.; Gourlay, K.; Kim, C.-S.; Saddler, J. N. Enhancing Hemicellulose Recovery and the Enzymatic Hydrolysis of Cellulose by Adding Lignosulfonates during the Two-Stage Steam Pretreatment of Poplar, ACS Sustainable Chemistry & Engineering 2015, 986-991.
Zhang, Z.; Wu, Q.; Song, K.; Ren, S.; Lei, T.; Zhang, Q. Using Cellulose Nanocrystals as a Sustainable Additive to Enhance Hydrophilicity, Mechanical and Thermal Properties of Poly(vinylidene fluoride)/Poly(methyl methacrylate) Blend. ACS Sustainable Chemistry & Engineering 2015, 3, 574-582.
Agarwal, U. P.; Sabo, R.; Reiner, R. S.; Clemons, C. M.; Rudie, A. W. Spatially Resolved Characterization of Cellulose Nanocrystal-Polypropylene Composite by Confocal Raman Microscopy. Applied Spectroscopy 2012, 66, 750-756.
Khoshkava, V.; Kamal, M. R. Effect of Cellulose Nanocrystals (CNC) Particle Morphology on Dispersion and Rheological and Mechanical Properties of Polypropylene/CNC Nanocomposites. ACS Applied Materials & Interfaces 2014, 6, 3146-3157.
Zhang, W.; He, X.; Li, C.; Zhang, X.; Lu, C.; Zhang, X.; Deng, Y. High performance poly (vinyl alcohol)/cellulose nanocrystals nanocomposites manufactured by injection molding. Cellulose 2014, 21, 485-494.
Tang, L.; Huang, B.; Lu, Q.; Wang, S.; Ou, W.; Lin, W.; Chen, X. Ultrasonication-assisted manufacture of cellulose nanocrystals esterified with acetic acid. Bioresource Technology 2013, 127, 100-105.
George, J.; Kumar, R.; Sajeevkumar, V. A.; Ramana, K. V.; Rajamanickam, R.; Abhishek, V.; Nadanasabapathy, S.; Siddaramaiah. Hybrid HPMC nanocomposites containing bacterial cellulose nanocrystals and silver nanoparticles. Carbohydrate Polymers 2014, 105, 285-292.
Kumar, S.; Hofmann, M.; Steinmann, B.; Foster, E. J.; Weder, C. Reinforcement of Stereolithographic Resins for Rapid Prototyping with Cellulose Nanocrystals, ACS Applied Materials & Interfaces 2012, 4, 5399-5407.
Kumar, A.; Negi, Y.; Choudhary, V.; Bhardwaj, N. Microstructural and mechanical properties of porous biocomposite scaffolds based on polyvinyl alcohol, nano-hydroxyapatite and cellulose nanocrystals. Cellulose 2014, 21, 3409-3426.

(56) References Cited

OTHER PUBLICATIONS

PCT/US16/40487, International Preliminary Report on Patentability, dated Mar. 16, 2018 (15 pages total).

Table 1: Design of Experiments for MA-CNC-PP composites

| RECIPE | MAH:NH2 | CNC:MA |
|---|---|---|
| Neat PP | - | - |
| TETA_MA_CNC 2 wt% | 2:1 (Rxn 1) | 1:2 |
| | | 1:5 |
| | | 1:10 |
| | | 1:19 |
| | 1:1 (Rxn 2) | 1:2 |
| | | 1:5 |
| | | 1:10 |
| | 1:2 (Rxn 3) | 1:2 |
| | 1:3 (Rxn 4) | 1:10 |
| TETA-MA-CNC 5 wt% | 2:1 (Rxn 1) | 1:2 |
| | | 1:5 |
| | | 1:10 |
| | | 1:19 |
| | 1:1 (Rxn 2) | 1:10 |
| | 1:2 (Rxn 3) | 1:10 |
| | 1:3 (Rxn 4) | 1:10 |
| TETA-MA-CNC 10 wt% | 2:1 (Rxn 1) | 1:5 |
| | | 1:9 |
| | 1:1 (Rxn 2) | 1:5 |
| | 1:3 (Rxn 4) | 1:9 |
| | | 1:9 |

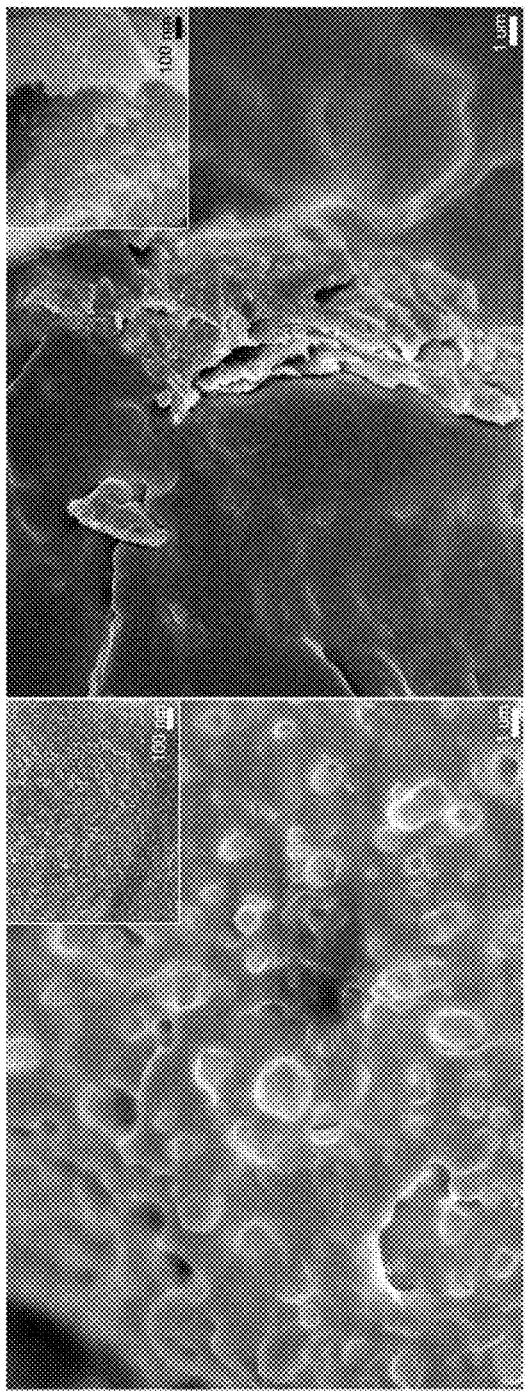
FIG. 9A
FIG. 9B
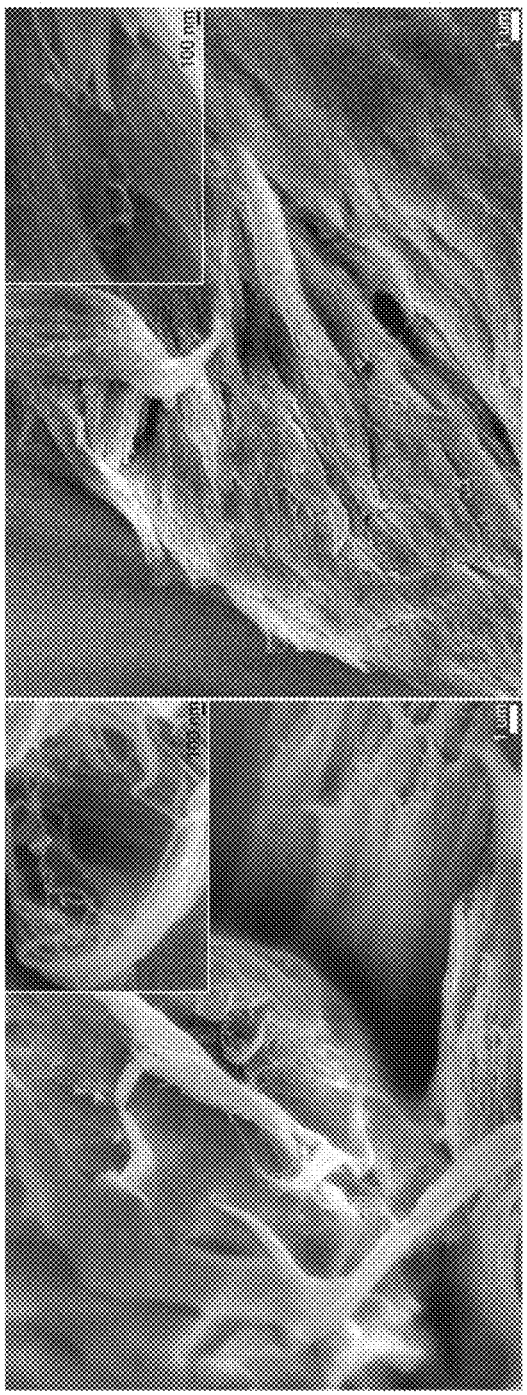
FIG. 9C
FIG. 9D

SYNTHETICALLY MODIFIED THERMOPLASTIC POLYMER COMPOSITES HAVING CELLULOSE NANOMATERIALS

CROSS REFERENCE TO RELATED APPLICATIONS

This application claims benefit of U.S. Provisional Application No. 62/186,417 filed Jun. 30, 2015. The disclosure of the above application is incorporated herein by reference.

GOVERNMENT SUPPORT CLAUSE

This invention was made with government support under Contract Number 1416493 awarded by the National Science Foundation. The government has certain rights in the invention.

FIELD

The invention relates to polymer composites and more specifically to polymer composites reinforced with cellulosic nanomaterials.

BACKGROUND

The statements in this section merely provide background information related to the present disclosure and may or may not constitute prior art.

Cellulosic nanomaterials (CN), are the smallest member of the overall hierarchy of cellulose materials and are the most abundant biopolymer. Having high tensile strength and elastic modulus, CN is useful in replacing higher cost and lower strength material, such as carbon or glass fiber, in polymeric composites. Cellulose nanocrystals (CNC), as a subset of CN, are highly ordered nano-scale crystals remaining after treatment to remove disordered amorphous regions from nanofibrils (the next member of the cellulose hierarchy). However, due to the intrinsic hydrophilic nature of CNC the use of CNC in polymer composites has proven challenging. Poor interfacial adhesion between the CNC and the polymer and poor dispersion of the CNC in the matrix contributes to lower tensile strength and elastic modulus of the composite than would otherwise be possible. Additionally, traditional materials used in polymer composites require high amounts of energy to produce. For example, glass fibers, among the most energy-efficient materials, require 48 MJ/kg to produce compared to 20 MJ/kg required to produce CNC.

Thermoplastics and thermoplastic composites are used widely in myriad of global markets. Polyolefins form an especially robust segment of this industry, comprising greater than 50% of the global thermoplastics market. An increased focus on improving sustainability, as well as persistent economic pressures, drive the need for continuous innovation in this space. In addition to low materials costs, automotive companies as well as electronic device, building-construction, and consumer products manufacturers rely on advantages provided by the selection of polyolefin resins for thermoplastic composites. For this reason, there are myriad advantages present in the thermoplastic processing space, from highly automated equipment which contributes to low cycle-times and labor requirements to the presence of a mature, global supplier base. These have all contributed to propagate thermoplastic composites into applications with increasingly demanding specifications.

While current polymer composites achieve their intended purpose, there is a need for an improved strength, cost-effective, energy-effective, bio-based polymer composite.

SUMMARY

A method of manufacturing a polymer coated cellulose nanocrystal composite material is provided. The method includes providing an aqueous cellulose nanocrystal (CNC) suspension mixture. A next step of the method includes drying the aqueous CNC suspension mixture to remove the liquid solvent from the aqueous CNC suspension mixture to form a dry CNC powder. The method next combines an Amine to melted Maleated-anhydride Polypropylene (MAPP) to form a Amine-functionalized MAPP (MA) mixture. The MA mixture is cooled and pelletized to form MA pellets. The MA pellets, the dry CNC powder, and a neat polypropylene (PP) are combined to form a CNC-PP mixture. The CNC-PP mixture is compounded by melting. The CNC-PP mixture is cooled and pelletized to form CNC-PP pellets.

In one aspect of the present invention, drying the aqueous CNC suspension mixture to remove the liquid solvent from the aqueous CNC suspension mixture to form a dry CNC powder further includes drying the aqueous CNC suspension mixture by at least one of freeze drying, spray drying, and solvent drying the aqueous CNC suspension mixture.

In another aspect of the present invention, the step of combining an Amine to melted Maleated-anhydride Polypropylene (MAPP) to form a Amine-functionalized MAPP (MA) mixture further includes combining Amine and MAPP at a weight percent ratio MAH:$NH_2$ of between 2:1 to 1:3.

In yet another aspect of the present invention, the step of combining the MA pellets, the dry CNC powder, and a neat polypropylene (PP) to form a CNC-PP mixture further includes combining the MA pellets and the dry CNC powder at a weight percent ratio CNC:MA of between 1:2 to 1:19.

In yet another aspect of the present invention, the step of compounding the CNC-PP mixture by melting further includes compounding the CNC-PP mixture in a high shear environment.

In yet another aspect of the present invention, the step of providing an aqueous cellulose nanocrystal (CNC) suspension mixture further includes providing a CNC suspension mixture wherein a CNC of the CNC suspension mixture is highly crystalline, has a rectangular shape, and has a density of about 1.6 g/cm$^3$.

In yet another aspect of the present invention, the step of providing an aqueous cellulose nanocrystal (CNC) suspension mixture further includes providing a CNC suspension mixture wherein a CNC of the CNC suspension mixture is thermally stable in a nitrogen environment up to 250° C., in an atmospheric environment up to 230° C. and has a strong negative surface charge of −45±1.8 mV.

In yet another aspect of the present invention, the step of combining the MA pellets, the dry CNC powder, and a neat polypropylene (PP) to form a CNC-PP mixture further comprises combining the MA pellets and the dry CNC powder at a weight percent ratio CNC:MA of between about 1:5 to about 1:10.

In yet another aspect of the present invention, a polymer coated cellulose nanocrystal is provided. The polymer coated cellulose nanocrystal includes a cellulose nanocrystal (CNC) and having a strong negative charge on a surface of the CNC, and a plurality of Amine-functionalized MAPP (MA). The CNC is highly crystalline. The plurality of MA is disposed on the surface of the CNC.

In yet another aspect of the present invention, the CNC has a density of about 1.6 g/cm$^3$.

In yet another aspect of the present invention, the CNC is thermally stable in a nitrogen environment up to 250° C., in an atmospheric environment up to 230° C., and has a strong negative surface charge of −45±1.8 mV.

In yet another aspect of the present invention, the plurality of MA includes each of the Amine and Maleated-anhydride Polypropylene (MAPP).

In yet another aspect of the present invention, a weight percent ratio of CNC:MA is from about 1:5 to about 1:10.

Other aspects and advantages of the invention will be explained in further detail by reference to the following description and appended drawings.

DRAWINGS

The drawings described herein are for illustration purposes only and are not intended to limit the scope of the present disclosure in any way.

Figure 6:
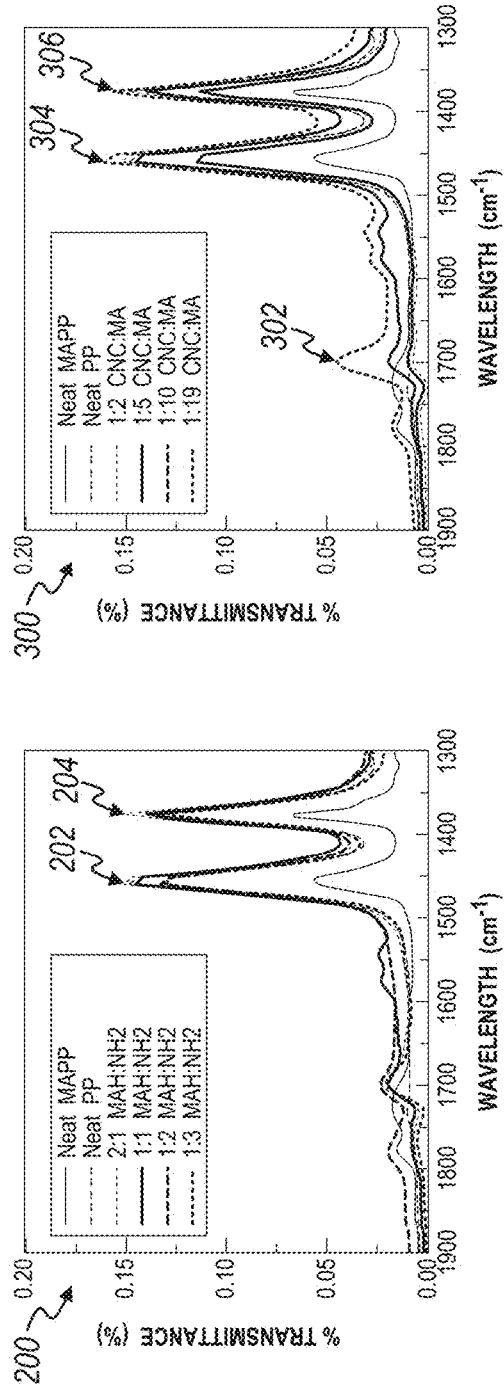
Figure 7:
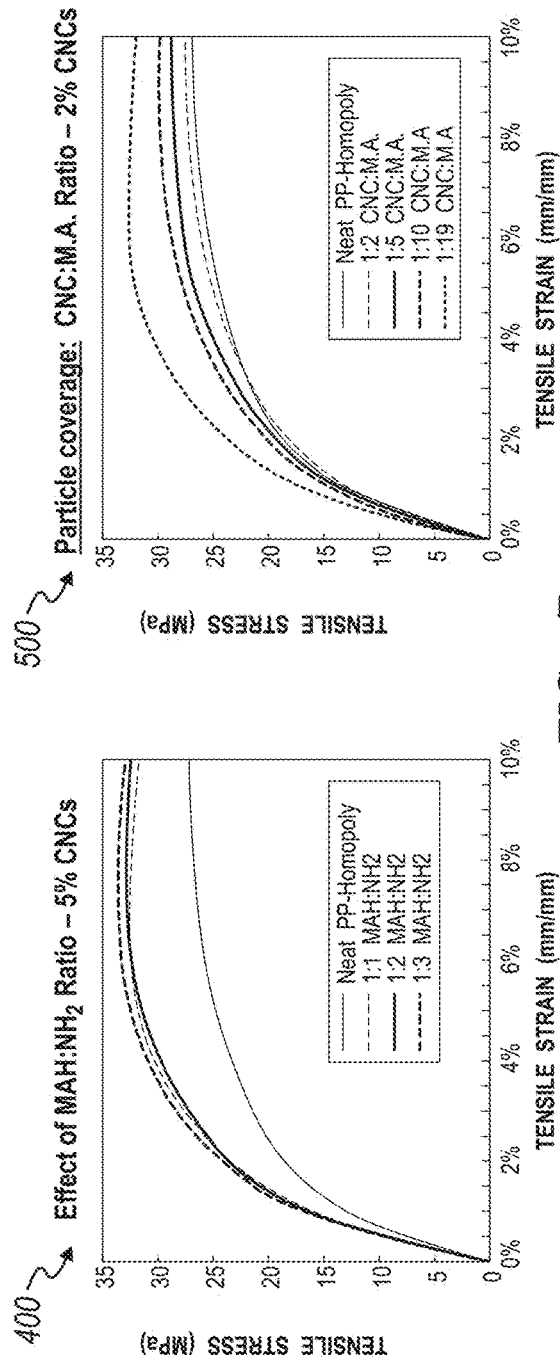
Figure 8B:
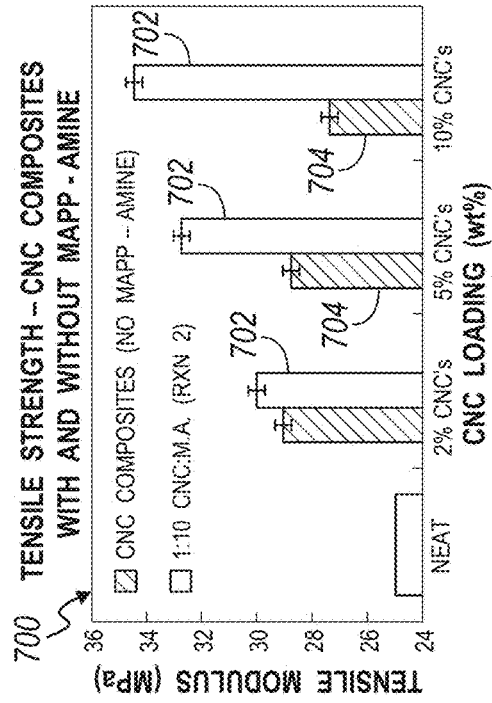
Figure 8A:
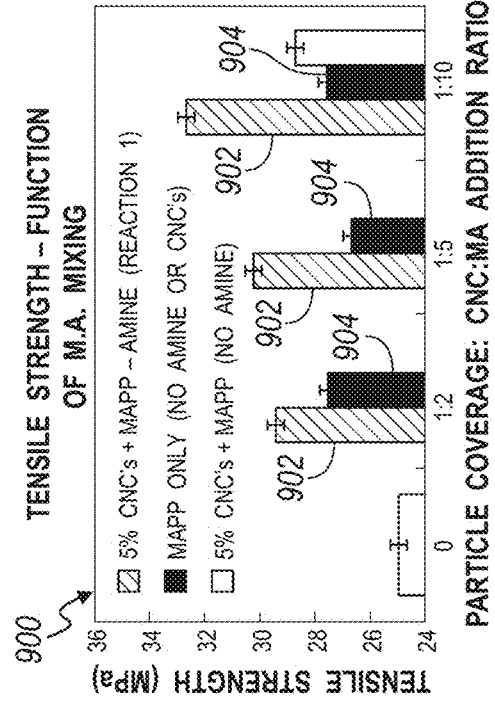
Figure 8C:
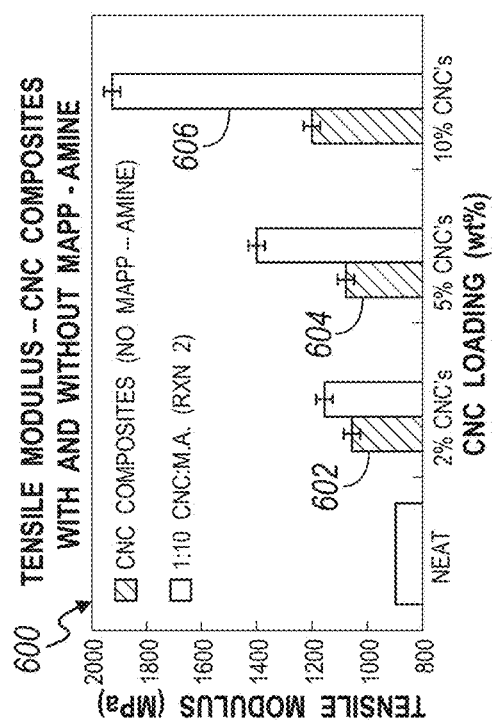
Figure 8D:
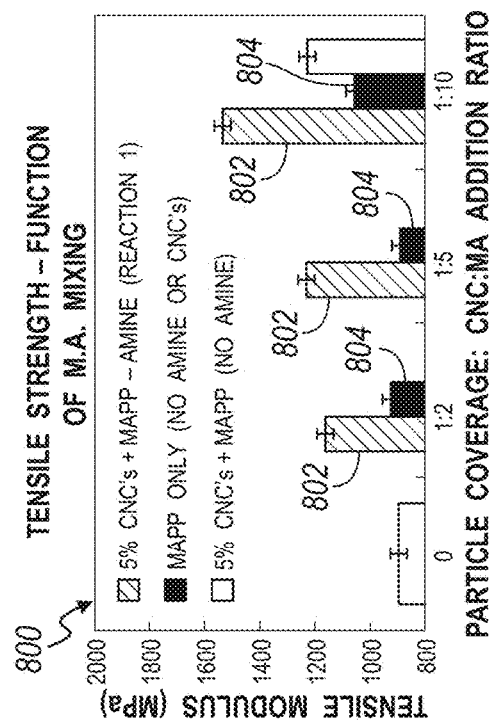

FIG. 6 includes graphs illustrating test data of MAH:NH$_2$ and CNC:MA according to the principles of the present invention;

FIG. 7 includes graphs illustrating test data of mechanical strength of MAH:NH$_2$ and CNC:MA according to the principles of the present invention;

FIG. 8 includes graphs illustrating test data of mechanical strength of CNC composites according to the principles of the present invention, and FIG. 9 includes photos of microstructure of CNC composites according to the principles of the present invention.

DETAILED DESCRIPTION

The following description is merely exemplary in nature and is not intended to limit the present disclosure, application, or uses.

Figure 1:
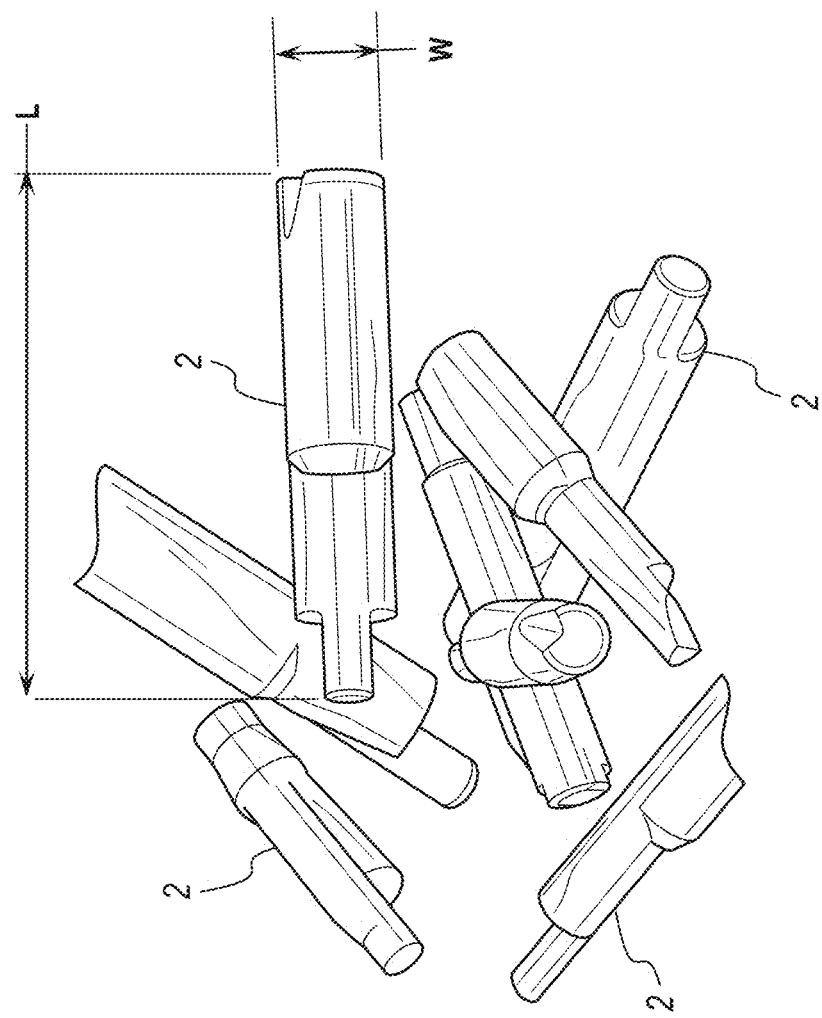
FIG. 1 illustrates a plurality of cellulose nanocrystals (CNC) according to the principles of the present invention.

Referring to FIG. 1, a plurality of cellulose nanocrystals (CNC) 2 are illustrated and will now be described. For example, the cellulose nanocrystals (CNC) 2 of FIG. 1 are shown after treatment to separate disordered amorphous regions (not shown) from the nanofibrils or cellulosic nanomaterials (CN). The dimensions of the CNC 2 are approximately 3 to 5 nm in width W and 100 to 300 nm long L. The CNC 2 are highly crystalline, roughly rectangular, and have a low density of about 1.6 g/cm$^3$. Other characteristics of CNC 2 include thermal stability in a nitrogen environment up to 250° C., in air up to 230° C. and a strong negative surface charge of −45±1.8 mV due to residual sulfate esters remaining after the sulfuric acid treatment used to separate the CNC from the disordered amorphous material.

Figure 2:
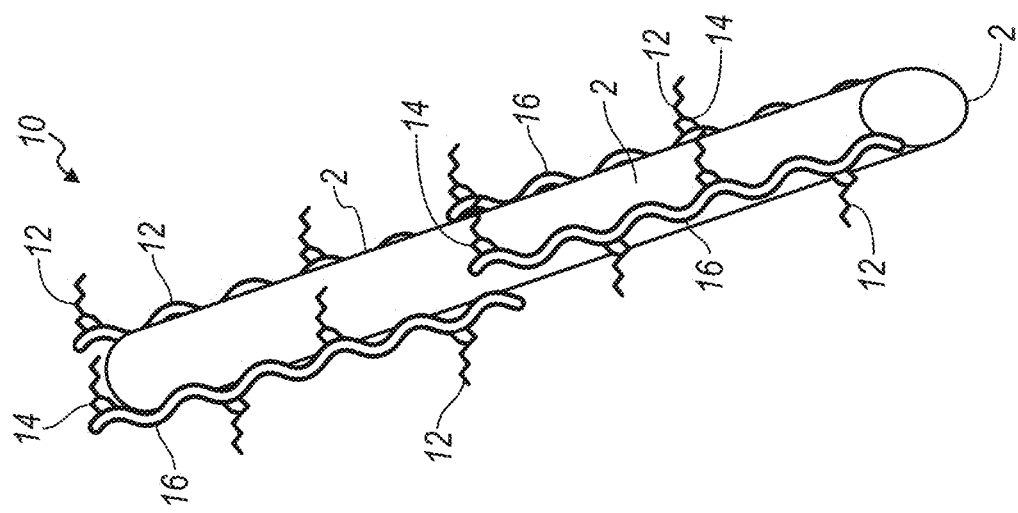
FIG. 2 illustrates a polymer-coated cellulose nanocrystal (CNC) according to the principles of the present invention.

Turning now to FIG. 2, a polymer coated cellulose nanocrystal is illustrated and generally indicated by reference number 10. The polymer coated cellulose nanocrystal 10 includes a cellulose nanocrystal (CNC) 2 and a plurality of DETA-functionalized MAPP (MA) chains 18. Additionally, the plurality of DETA-functionalized MAPP (MA) chains 18 are bonded to the cellulose nanocrystal (CNC) 2 and include a Maleic acid (MAH) chain 14, a Maleated-anhydride Polypropylene (MAPP) chain 16, and Diethylenetriamine (DETA) chain 12. More particularly, a Polypropylene (PP) chain is modified by a plurality of MAH chains 14 becoming Maleated-anhydride Polypropylene (MAPP) 16. Next, each of a plurality of Diethylenetriamine (DETA) chains 12 are bonded to the Maleated-anhydride Polypropylene (MAPP) chain 16 via each of the Maleic acid chains 14.

Figure 3:
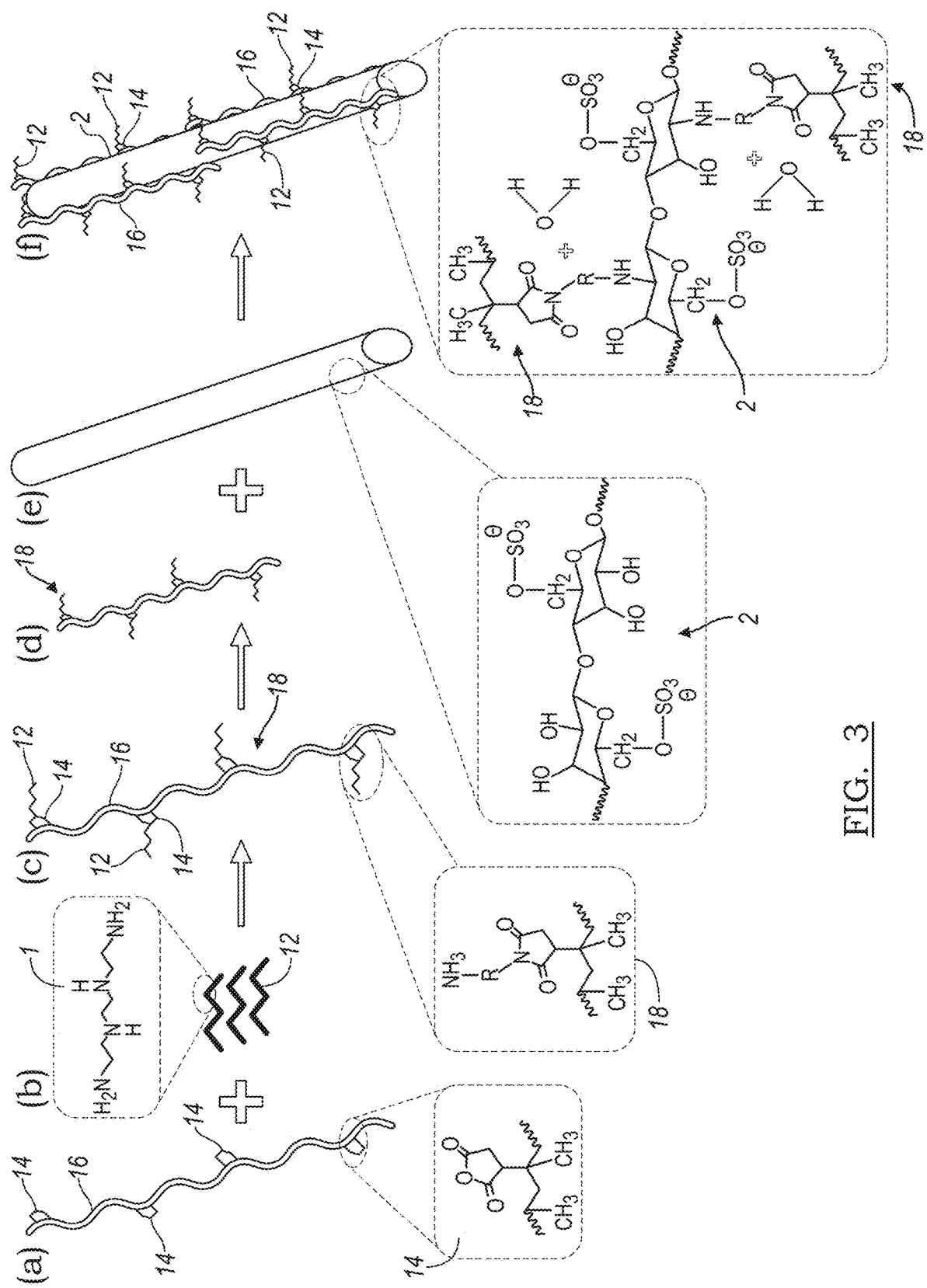
FIG. 3 is a graphical representation of DETA-MA-CNC functionalization according to the principles of the present invention.
Figures 4, 5:
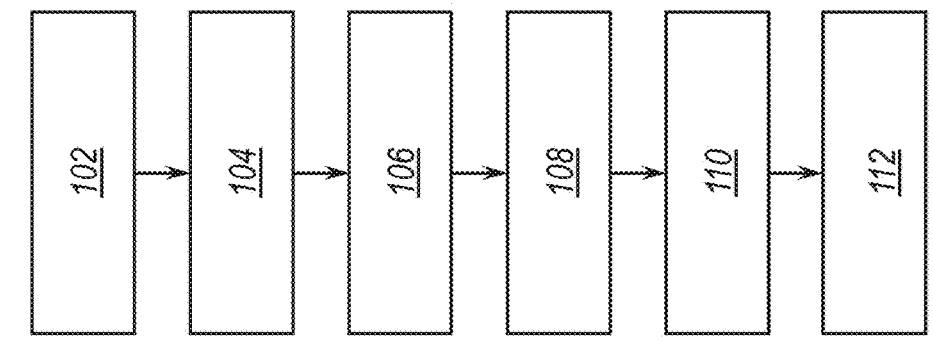
FIG. 4 is a flowchart depicting a method of producing stabilized cellulose nanocrystal according to the principles of the present invention.
FIG. 5 is a table illustrating a Design of Experiments for DETA-MA-CNC composites according to the principles of the present invention.

Referring now to FIGS. 3 and 4, a method 100 of preparation of polymer coated cellulose nanocrystal is illustrated and will now be described. The method 100 includes a first step 102 of providing an aqueous CNC suspension. The aqueous solution CNC was obtained from Forest Products Laboratory (Madison, Wis.). A second step 104 includes freeze drying, spray drying, and solvent drying the stabilized aqueous cellulose nanocrystal (CNC) suspension mixture until a liquid solvent of the stabilized aqueous cellulose nanocrystal (CNC) suspension is sublimated. A third step 106 includes adding a measured amount of DETA to a measured amount of melted MAPP (FIGS. 3 (*a*) and (*b*)) forming DETA-functionalized MAPP (MA) (FIG. 1(*c*)). While the present example of the invention includes using DETA, use of other Amines or Amine groups is conceivable without departing from the scope of the invention. For example, Triethylenetetramine (TETA) may be used to form an Amine-functionalized MAPP (MA). A fourth step 108 includes cooling and pelletizing, the DETA-functionalized MAPP (MA) mixture. A fifth step 110 includes fabricating the CNC-PP composites by adding DETA-functionalized MAPP (MA) (FIG. 3(*d*)) with varying amounts of dried, powderized CNCs (FIG. 3(*e*)) and neat PP and melt compounding (FIG. 3(*f*)). A sixth step 112 includes cooling and pelletizing the mixture. The melt mixing is performed in a high-shear environment.

Referring now to Table 1 of FIG. 5, Table 1 presents the design of experiments for identifying the ideal mix ratios of MAH:NH$_2$ for the third step 106 (Column 2 of Table 1) and CNC:MA for the fifth step 110 (Column 3 of Table 1). Regarding the third step 106 of the method 100, four principle mix ratios of maleic-acid to amine groups (MAH:NH$_2$) which were tested in order to determine both a process-capable mix (e.g. a mixture which would produce a coherent, continuous strand which could be used in subsequent steps) and a trend in which the benefits of the presence of amine groups to the overall composite could be determined. The mix ratios are 2:1 MAH:NH$_2$, 1:1 MAH:NH$_2$, 1:2 MAH:NH$_2$ and 1:3 MAH:NH$_2$ (MA) and are denoted Reactions 1-4, respectively. The reaction progressed in the barrel of the melt-compounder at 200° C., in a high-shear environment which produced a strand of melted polymer which was water-cooled, air-dried and pelletized.

Regarding the fifth step 110, there were four principle mix ratios of MA to CNCs which were mixed with neat PP and fed into the melt-compounder. These mix ratios were selected in order to discern which were more likely to completely cover the CNCs with the MA, which itself was designed to mix with neat PP to provide a good dispersion. The mix ratios are 1:2, 1:5, 1:9, 1:10, and 1:19 CNC:MA. This secondary step was carried out in the same high-shear environment, producing a strand of melted MA-CNC-PP polymer composite which was water-cooled, air-dried and pelletized.

Referring now to Column 1 of Table 1, the Design of Experiments further includes composites loaded at 2, 5 and 10 wt % (CNC wt %). Composites of all possible recipes were fabricated at 2 wt % CNCs, with fabrication of the most promising 5 wt % and 10 wt % recipes following. Finally, the mix ratios of the composites at 10 wt % governed that 1:9 was the highest mixing ratio of CNC:MA possible (e.g. no neat PP in these recipes); similarly, 5 wt % was the highest mix ratio possible of the 1:19 CNC:MA composites (e.g. no neat PP in this recipe). Prior to performing reaction-extrusion, various MAH:NH$_2$ recipes were prepared in a batch-reaction method. In measures of 200g, each recipe was prepared in THF under a fume hood in order to prove reaction progression. The mixtures were heated at 85° C. and stirred vigorously with a spatula for five hours in early samples and 14 hours for the remaining samples. The THF was then decanted off and the precipitate powder was dried and analyzed by an IR infrared spectrometer which performed Fourier-Transform Infrared Spectroscopy (FTIR). Once suitable MAH:NH$_2$ ratios were selected, these recipes were fabricated without solvent in the melt-compounder. Subsequent to melt-compounding, a composite pellet from each recipe was heated and pressed into a thin-film, approximately 100 µm thick, and also analyzed by FTIR to confirm a similar extent of reaction occurred in the high-shear environment.

During the process of melt-mixing, there is a thermodynamically favorable condensation reaction between the amine groups on the Triethylenetetramine (TETA) and the anhydride side groups on the PP. Both primary and secondary amines are present in the TETA and these seek to cleave the oxygen from the cyclic anhydride, forming secondary amides. The graphs of FIG. 6 illustrate the IR spectra for this reaction with both the MAH:NH$_2$ and the CNC:MA reaction discussed. In the first graph 200, the formation of peaks in the IR spectra at 1540 cm-1 202 and 1580 cm-1 204 are evidence of the MAH:NH$_2$ reaction progression. The peak for the reaction ratio of 1:1 MAH:NH$_2$ was the strongest indicating the most complete reaction. In the second graph 300, the formation of the peak at 1700 cm-1 302 for the 1:10 CNC:MA and its subsequent strengthening for the 1:19 CNC:MA indicates increased symmetric carbonyl imide stretching as increased MA is mixed with CNCs in the PP. The peaks at 1540 cm-1 304 and 1580 cm-1 306 are maintained for the 1:10 CNC:MA and the 1:19 CNC:MA indicating the presence of amides as well.

Five samples of each recipe were analyzed via tensile testing according to ASTM D638. The stress-strain plots 400, 500 of FIG. 7 show the mechanical strength of representative specimens containing 5 wt % nanoparticles and 2 wt % nanoparticles. Tensile tests were performed on an Instron Model 3345 load frame with a 5 kN load cell per ASTM D638 with a crosshead speed of 5.0 mm/min. At least five specimens of each sample recipe were analyzed at each loading (2, 5 and 10 wt %). Specimen dimensions were taken with a Mitutoyo digital micrometer, with 1 µm accuracy. The specimens were tested as injected, pulled from a highly-polished hardened-steel mold. Scanning electron microscopy (SEM) was performed using a JEOL JSM-7500F cold emission microscope on representative fracture surfaces from the 5 wt % tensile-test bars.

The tensile curves were taken from samples mixed at 1:10 CNC:MA ratio, and indicate the increase in tensile strength and elastic modulus as increasing amines are introduced to the MAPP. Importantly, overall ductility in the polymer is maintained at >10% strain-to-failure, substantiating the value of the chemical functionalization (e.g. if there were no benefit to the chemistry, the presence of the highly crystalline nanoparticle would increase modulus to the detriment of both ultimate tensile strength and % elongation). The 1:3 MAH:NH2 presented the highest tensile strength and modulus. The graphs 400, 500 of FIG. 7 illustrate the improvement in mechanical behavior as the CNCs are more completely coated with functionalized MA, relative to non-functionalized PP. As the particle coverage increases the ultimate tensile strength and elastic modulus are both increased concurrently and this trend is supported by behavior at the other nanoparticle loadings (e.g. with both 2 wt % and 5 wt % CNCs the mechanical properties of the composite increase both with increasing NH2 and more complete particle coverage). This behavior is likely due to the presence of increased covalent linkages and electrostatic interactions at the particle-polymer interface. A related effect derives from increased inter-chain hydrogen bonding as there is a higher quantity of hydrogen-oxygen interactions due to increased imide/amide presence.

Referring now to FIG. 8, illustrations of the modulus and tensile strength values are given and will now be discussed. Values are shown for neat PP (left-most data in each plot) followed by composites loaded with 2, 5 and 10 wt % nanocrystals. The error bars represent ±1 standard deviation. Graphs 600 and 700 of FIG. 8 present the average tensile modulus and tensile strength of 1:10 CNC:MA composites, fabricated from 1:2 MAH:NH$_2$ polymer. The elastic modulus increased slightly with increasing amounts of CNCs in the absence of MA 602 but there is little statistical difference above 2 wt % 604. Dramatic increases in stiffness are exhibited when the CNCs are present with MA chemistry 604 as the elastic modulus increases 116% (from 895 to 1933 MPa) 606. The effect of the chemistry described in this study is evident from these figures, particularly for the tensile strength values, which increase by 38% (from 25.0 to 34.4 MPa) at 5.5% strain for the 1:10 CNC:MA composites 702. The lack of helpful chemistry is evident from the decrease in tensile strength as additional nanoparticles are added in the absence of the MA chemistry 704. It is common for stiff particles to increase the stiffness of polymeric composites but for improved tensile strength it is necessary to impart improved interfacial adhesion achieved most effectively by way of covalent linkages, which implies enhancements in the chemistry of the composite. Graphs 800 and 900 of FIG. 8 describe the effect on the composite when one component of the recipe is removed, as neat PP is plotted along with various composites at differing MA particle coverage ratios (1:2, 1:5, and 1:10 CNC:MA addition ratios). The tensile modulus for composites with 1:1 MAH:NH2 CNC:MA loaded with 5 wt % CNCs 802, 902 is shown and compared against the tensile modulus of PP-MAPP co-polymers and with 1:10 CNC-MAPP-PP composites 804, 904 (e.g. composites fabricated with no DETA). The processing parameters were kept consistent between the runs, for example the MAPP was melt-compounded with neat PP in the first step, cooled and pelletized, and the CNCs were added in a second compounding step to impart consistent heat-histories to the composites. The tensile strength is shown analogously in graph 900.

Further regarding FIG. 8, considering the PP:MAPP composites, given the differing molecular weights and degree of branching between neat PP and it was critical to investigate the effect of simply co-extruding the two polymers together. As expected there was a very modest effect on mechanical properties overall, and the increases seen can be explained by the higher molecular weight of the MAPP. Regarding the CNC+MAPP composites, only 1:10 CNC:MAPP recipes were fabricated due to material constraints. The moderate mechanical property improvements from the addition of the MAPP are most likely due to the interaction with the secondary bond interaction between OH— groups which are of lower bond-strength than the covalent linkages formed from the secondary amides in the DETA-MA-CNC composites.

Turning now to FIG. 9, scanning electron micrographs of the fracture surfaces of tensile-test specimens are illustrated. FIG. 9(a) shows the microstructure of unfilled PP, FIG. 9 (b) shows the fracture surface with untreated CNCs in PP, FIGS. 9 (c) and (d) shows the evolution of the microstructure as levels of $NH_2$ are increased. In the composite containing untreated CNCs, PP-rich/CNC-poor regions are evident as regions of agglomerated CNCs are clearly visible (FIG. 9(b)). The PP surface appears glassy, while the CNC-rich areas have a granular look. Additionally, multiple crystals can be seen in the fracture surface (FIG. 9(b) inset). It appears that the failure mode was particle pull-out, with the shape and morphology of the individual crystals matching that reported elsewhere. FIG. 9(c) depicts a composite with a CNC:MA ratio of 1:5 and FIG. 9(d) depicts a composite with a CNC:MA ratio of 1:10. The amine-functionality has a direct effect on the microstructure of the composite, with individual nanoparticles no longer distinguishable. The morphology of the failures for the composites with increased amine content is more ductile in nature, as evidenced by out-of-focus regions in the deeper field of view (e.g. there is a greater portion of the micrograph which is out-of-focus indicative of increased ductility in the failure). The composite containing untreated CNCs has failed at the particle-polymer interface whereas the composites which have been treated with DETA appear to have failed at the polymer-polymer interface. Evidence for this is observed in the fibrillar morphology shown in the FIGS. 9(c) and (d) insets.

The specific gravity of natural fillers compared to glass and other mineral fillers and dispersion aids is a further advantage of using a low aspect ratio natural filler as a processing/dispersion aid. For example, cellulose has a specific gravity of 1.6, whereas glass fiber has a specific gravity of approximately 2.5.

Many nanoparticles are able to stiffen thermoplastic matrices and gains have been reported with both renewable and synthetically-derived particles. In the present study, DETA has been used to alter the functionality of cyclic maleated-anhydride side groups attached to polypropylene. Cellulose nanocrystals were then added and melt-compounded in a later step. The results of this combined chemistry improved stiffness by 116% and tensile strength by 38%, while maintaining a high strain-at-break value (>10% for composites loaded at 5 wt %). The formation of covalent linkages at the particle surface, in conjunction with secondary bond interactions, synergistically strengthens and stiffens PP composites. Additive manufacturing, automotive applications, construction materials and consumer products are likely to benefit from the improved properties afforded by using this solvent-free system to disperse/strengthen cellulose nanocrystals in polypropylene.

The description of the invention is merely exemplary in nature and variations that do not depart from the spirit of the invention are intended to be within the scope of the invention. Such variations are not to be regarded as a departure from the spirit and scope of the invention.

We claim:

1. A method of manufacturing a polymer coated cellulose nanocrystal composite material, the method comprising:
providing an aqueous cellulose nanocrystal (CNC) suspension mixture;
drying the aqueous CNC suspension mixture to remove the liquid solvent from the aqueous CNC suspension mixture to form a dry CNC powder;
combining an Amine to melted Maleated-anhydride Polypropylene (MAPP) to form an Amine-functionalized MAPP (MA) mixture at a weight percent ratio of Maleic acid (MAH):$NH_2$ of between 2:1 to 1:3;
cooling and pelletizing the MA mixture to form MA pellets;
combining the MA pellets, the dry CNC powder, and a neat polypropylene (PP) to form a CNC-PP mixture;
compounding the CNC-PP mixture by melting, and
cooling and pelletizing the CNC-PP mixture to form CNC-PP pellets.

2. The method of manufacturing a polymer coated cellulose nanocrystal of claim 1, wherein drying the aqueous CNC suspension mixture to remove the liquid solvent from the aqueous CNC suspension mixture to form a dry CNC powder further comprises drying the aqueous CNC suspension mixture to remove the liquid solvent from the aqueous CNC suspension mixture to form a dry CNC powder by at least one of freeze drying, spray drying, and solvent drying the aqueous CNC suspension mixture.

3. The method of manufacturing a polymer coated cellulose nanocrystal of claim 1, wherein combining the MA pellets, the dry CNC powder, and a neat polypropylene (PP) to form a CNC-PP mixture further comprises combining the MA pellets, the dry CNC powder, and a neat polypropylene (PP) to form a CNC-PP mixture wherein combining the MA pellets and the dry CNC powder is at a weight percent ratio CNC:MA of between 1:2 to 1:19.

4. The method of manufacturing a polymer coated cellulose nanocrystal of claim 1, wherein compounding the CNC-PP mixture by melting further comprises compounding the CNC-PP mixture by melting in a high shear environment.

5. The method of manufacturing a polymer coated cellulose nanocrystal of claim 1, wherein providing an aqueous cellulose nanocrystal (CNC) suspension mixture further comprises providing an aqueous cellulose nanocrystal (CNC) suspension mixture wherein a CNC of the CNC suspension mixture is highly crystalline, has a rectangular shape, and has a density of about 1.6 g/cm$^3$.

6. The method of manufacturing a polymer coated cellulose nanocrystal of claim 1, wherein providing an aqueous cellulose nanocrystal (CNC) suspension mixture further comprises providing an aqueous cellulose nanocrystal (CNC) suspension mixture suspension mixture wherein a CNC of the CNC suspension mixture is thermally stable in a nitrogen environment up to 250° C., in an atmospheric environment up to 230° C. and has a strong negative surface charge of −45±1.8 mV.

7. The method of manufacturing a polymer coated cellulose nanocrystal of claim 1, wherein combining the MA pellets, the dry CNC powder, and a neat polypropylene (PP) to form a CNC-PP mixture further comprises combining the MA pellets, the dry CNC powder, and a neat polypropylene (PP) to form a CNC-PP mixture wherein the MA pellets and the dry CNC powder are at a weight percent ratio CNC:MA of between about 1:5 to about 1:10.

8. A method of manufacturing a polymer coated cellulose nanocrystal composite material, the method comprising:
providing an aqueous cellulose nanocrystal (CNC) suspension mixture;

drying the aqueous CNC suspension mixture to remove the liquid solvent from the aqueous CNC suspension mixture to form a dry CNC powder using at least one of freeze drying, spray drying, and solvent drying, and wherein a CNC of the dry CNC powder is highly crystalline and has a rectangular shape;

combining an Amine to melted Maleated-anhydride Polypropylene (MAPP) to form an Amine-functionalized MAPP (MA) mixture at a weight percent ratio of Maleic acid (MAH):$NH_2$ of between 2:1 to 1:3;

cooling and pelletizing the MA mixture to form MA pellets;

combining the MA pellets, the dry CNC powder, and a neat polypropylene (PP) to form a CNC-PP mixture;

compounding the CNC-PP mixture by melting, and cooling and pelletizing the CNC-PP mixture to form CNC-PP pellets.

9. The method of manufacturing a polymer coated cellulose nanocrystal of claim 8, wherein combining the MA pellets, the dry CNC powder, and a neat polypropylene (PP) to form a CNC-PP mixture further comprises combining the MA pellets, the dry CNC powder, and a neat polypropylene (PP) to form a CNC-PP mixture wherein combining the MA pellets and the dry CNC powder is at a weight percent ratio CNC:MA of between 1:2 to 1:19.

10. The method of manufacturing a polymer coated cellulose nanocrystal of claim 9, wherein compounding the CNC-PP mixture by melting further comprises compounding the CNC-PP mixture by melting in a high shear environment.

11. The method of manufacturing a polymer coated cellulose nanocrystal of claim 10, wherein providing an aqueous cellulose nanocrystal (CNC) suspension mixture further comprises providing an aqueous cellulose nanocrystal (CNC) suspension mixture wherein a CNC of the CNC suspension mixture has a density of about 1.6 g/cm3.

12. The method of manufacturing a polymer coated cellulose nanocrystal of claim 11, wherein providing an aqueous cellulose nanocrystal (CNC) suspension mixture further comprises providing an aqueous cellulose nanocrystal (CNC) suspension mixture wherein the CNC of the CNC suspension mixture is thermally stable in a nitrogen environment up to 250° C., in an atmospheric environment up to 230° C. and has a strong negative surface charge of −45±1.8 mV.

13. The method of manufacturing a polymer coated cellulose nanocrystal of claim 12, wherein combining the MA pellets, the dry CNC powder, and a neat polypropylene (PP) to form a CNC-PP mixture further comprises combining the MA pellets, the dry CNC powder, and a neat polypropylene (PP) to form a CNC-PP mixture wherein the MA pellets and the dry CNC powder are at a weight percent ratio CNC:MA of between about 1:5 to about 1:10.

* * * * *